United States Patent
Singh et al.

(10) Patent No.: US 8,317,156 B2
(45) Date of Patent: Nov. 27, 2012

(54) METERING VALVE ARRANGEMENT

(75) Inventors: Gurlat Singh, Coventry (GB);
Alexander James Horne, Pershore (GB)

(73) Assignee: Goodrich Control Systems (GB)

( * ) Notice: Subject to any disclaimer, the term of this patent is extended or adjusted under 35 U.S.C. 154(b) by 337 days.

(21) Appl. No.: 12/768,197

(22) Filed: Apr. 27, 2010

(65) Prior Publication Data
US 2010/0288364 A1 Nov. 18, 2010

(30) Foreign Application Priority Data
May 12, 2009 (GB) .................................. 0908113.4

(51) Int. Cl.
*F16K 31/04* (2006.01)

(52) U.S. Cl. ......... 251/129.04; 251/129.11; 251/129.13; 137/554; 318/685; 318/696

(58) Field of Classification Search ............. 251/129.04, 251/129.11, 129.13; 137/554; 318/696, 318/685
See application file for complete search history.

(56) References Cited

U.S. PATENT DOCUMENTS

| | | | |
|---|---|---|---|
| 4,584,495 A * | 4/1986 | Kordik | 310/49.32 |
| 5,518,015 A * | 5/1996 | Berget et al. | 137/1 |
| 5,814,964 A * | 9/1998 | Kimura | 318/685 |
| 6,157,888 A * | 12/2000 | Suzio et al. | 701/110 |
| 6,209,521 B1 | 4/2001 | Rembold et al. | |
| 6,597,077 B2 * | 7/2003 | Lin et al. | 310/49.37 |
| 6,745,997 B2 * | 6/2004 | Moeller et al. | 251/129.04 |
| 6,957,801 B2 * | 10/2005 | Wilfert et al. | 251/129.04 |
| 7,640,078 B2 * | 12/2009 | Smirnov | 700/282 |
| 7,963,185 B2 * | 6/2011 | Spickard | 74/337.5 |
| 2003/0010950 A1 * | 1/2003 | Schiavone et al. | 251/129.11 |
| 2005/0016176 A1 * | 1/2005 | Griffiths et al. | 60/734 |
| 2008/0009978 A1 * | 1/2008 | Smirnov | 700/282 |
| 2008/0067463 A1 * | 3/2008 | Jones et al. | 251/208 |
| 2008/0309280 A1 * | 12/2008 | Vanderzee | 318/696 |
| 2009/0277519 A1 * | 11/2009 | Parker et al. | 137/625.65 |

FOREIGN PATENT DOCUMENTS

| WO | 8602565 | 5/1986 |
|---|---|---|
| WO | 03048555 | 6/2003 |

OTHER PUBLICATIONS

European Search Report dated Jan. 24, 2011.

* cited by examiner

*Primary Examiner* — Eric Keasel
*Assistant Examiner* — Minh Le
(74) *Attorney, Agent, or Firm* — Andrus, Sceales, Starke & Sawall, LLP

(57) ABSTRACT

A method is described for controlling the operation of a metering valve driven by a stepper motor, a position sensor normally providing position information to allow control over the metering valve in a closed loop manner. The method comprises the steps of:
  performing a calibration operation to derive a relationship between stepper motor position and metering valve position;
  controlling the operation of the metering valve in a closed loop manner; and
  controlling the operation of the metering valve in an open loop manner in the event that the position sensor output is thought to be unreliable; wherein, when operating in the open loop manner, the metering valve is moved to a desired angular position by using the relationship derived in the calibration operation to determine the stepper motor position associated with the desired metering valve position and moving the stepper motor to the determined stepper motor position.

11 Claims, 1 Drawing Sheet

METERING VALVE ARRANGEMENT

This invention relates to a method for use in controlling the operation of a metering valve for use in aerospace applications, and in particular to a method suitable for use in controlling the operation of a rotary metering valve.

It is well known to use a rotary valve in metering the supply of fuel to, for example, a gas turbine engine. One such valve comprises an angularly movable valve member movable relative to a fixed plate between a closed position in which an opening formed in the plate is obscured or closed by the valve member and a fully open position in which the opening is not obscured by the valve member, allowing fuel to flow through the opening from an inlet side thereof to an outlet side thereof. A range of intermediate positions in which the opening is partially obscured are also permitted. The valve member is mounted upon a shaft which is driven for movement by a stepper motor through a suitable gear arrangement. The stepper motor has natural set index points called steps and these steps represent the positions the stepper motor will remain fixed at when there is no electrical power applied to the motor.

Operation of the stepper motor is controlled by a control unit, for example in the form of a Propulsion Control & Monitoring Unit (PCMU) which is of dual channel form, although other forms of control unit could be used. A position sensor in the form of a dual channel RVDT supplies position information indicative of the angular position of the valve member to the PCMU to permit closed loop control over the operation of the metering valve.

It is desirable to provide an arrangement whereby, in the event of a major system fault, for example a loss of electrical power, the metering valve operates in a known manner. For example, where used in controlling the supply of fuel to an engine of a multi-engine aircraft with turbo-fan engines, the metering valve may be moved to, for example, its minimum level or to its maximum level in the event of such a failure. Where used in controlling the supply of fuel to a turbo-prop of a single engined aircraft then, rather than moving to a minimum or maximum position in the event of a major failure, it may be preferred to hold the metering valve in a fixed intermediate position. As alluded to above, the use of a stepper motor driven rotary metering valve in such an arrangement is advantageous in that the stepper motor can be relatively easily configured to remain fixed against movement under such conditions.

If, rather than suffer a complete loss of power, the PCMU is still able to drive the stepper motor for movement but the closed loop control is lost as a result of, for example, the loss of both output channels from the RVDT, then the PCMU may be arranged to drive the stepper motor to a predetermined position, and a governor device used to control the supply of fuel to the engine. Although such operation will ensure that the aircraft engine will continue to operate, it is very likely that the supply of fuel to the engine will change and this may give rise to an unexpected or un-commanded engine response which is undesirable.

It is an object of the invention to provide a method for controlling the operation of a metering valve in which at least some of the disadvantages outlined hereinbefore are overcome or are of reduced effect.

According to the present invention there is provided a method of controlling the operation of a metering valve driven by a stepper motor, a position sensor normally providing position information to allow control over the metering valve in a closed loop manner, the method comprising the steps of:

performing a calibration operation to derive a relationship between stepper motor position and metering valve position;

controlling the operation of the metering valve in a closed loop manner; and controlling the operation of the metering valve in an open loop manner in the event that the position sensor output is thought to be unreliable; wherein, when operating in the open loop manner, the metering valve is moved to a desired angular position by using the relationship derived in the calibration operation to determine the stepper motor position associated with the desired metering valve position and moving the stepper motor to the determined stepper motor position.

The stepper motor position is conveniently monitored by counting of the steps through which it is moved, in use.

It will be appreciated that, in such an arrangement, control over the operation of the metering valve can be maintained even in the event of the loss of the output of the position sensor, or it being determined that the position sensor output can no longer be relied upon. The arrangement permits metering valve control to be maintained rather than simply resulting in the metering valve being driven to a fixed predetermined position, and avoids the need to provide a separate governor to control fuelling in these circumstances.

The metering valve is preferably a rotary main metering valve. The position sensor is preferably an RVDT. Conveniently, the rotary main metering valve is controlled by a control unit, for example in the form of a Propulsion Control & Monitoring Unit (PCMU) which is preferably of dual channel form. In such an arrangement the RVDT is also preferably of dual channel form.

The stepper motor is preferably a dual-phase stepper motor controlled by the application of appropriate currents to the phases thereof. For example, the stepper motor may have an operating current of 500 mA, and each natural step of the stepper motor may be achieved by shifting the current applied to each phase by a set amount, for example of 125 mA. Preferably the stepper motor is controlled using a micro-stepping technique whereby smaller shifts in the applied currents can be used to achieve movement of the motor through fractions of a natural step, for example in quarter steps.

The calibration step is preferably performed as part of a power-up procedure. For example it maybe undertaken upon powering up of the PCMU. The calibration step preferably involves sweeping the metering valve through its range of normal movement between a fully open position and a fully closed position whilst monitoring the output of the position sensor. Where the system includes a dual channel PCMU, the calibration step is preferably undertaken for both channels. As part of the calibration step, a gain value is preferably calculated as a ratio of the movement of the stepper motor (preferably measured in quarter steps of the stepper motor) to the change in the output of the position sensor. The gain value is preferably stored in a non-volatile memory associated with the metering unit of which the metering valve forms part. The gain value serves to express the relationship between the stepper motor position and valve position derived in the calibration operation The gain value is preferably determined using information relating to the stepper motor positions corresponding to the zero and maximum flow positions of the rotary valve. The stepper motor positions corresponding to the maximum and minimum hard stop positions of the metering valve may further be used. Preferably, allowance is further made for potential backlash in the drive train between the stepper motor and the metering valve.

Conveniently, allowance for potential backlash is achieved by driving the valve member to a known open position, using the position sensor to determine when that position is reached, then driving the stepper motor to move through a predetermined number of steps, and sensing the position of the valve member using the position sensor. This procedure is preferably undertaken before the part of the calibration operation that involves sweeping the metering valve through its range of movement.

The invention will further be described, by way of example, with reference to the accompanying drawings, in which.

Figure 1:
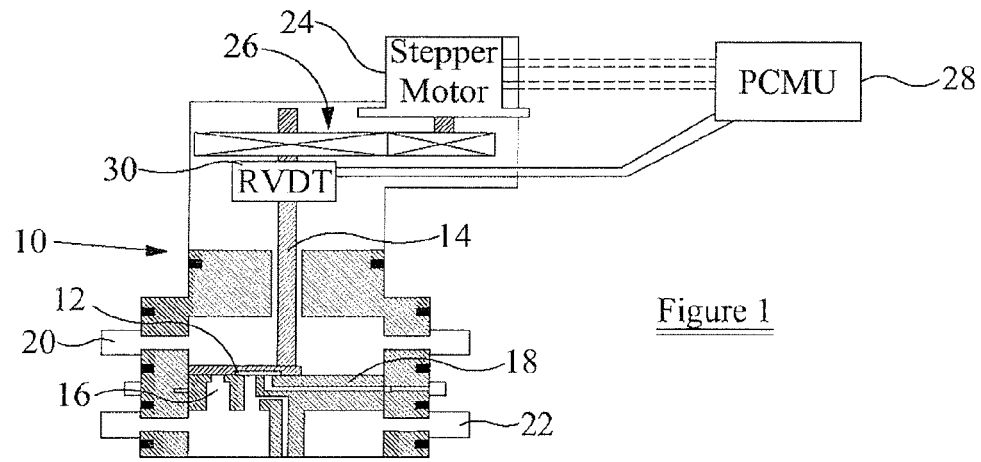
FIG. 1 is a schematic view illustrating a metering valve.

Referring firstly to FIG. 1 there is illustrated a metering valve 10 in the form of a rotary main metering valve. The metering valve 10 comprises a valve member 12 mounted upon a shaft 14 for angular movement between a closed position in which the valve member 12 completely closes an opening 16 provided in a valve plate 18, and a fully open position in which the opening 16 is not obscured by the valve member 12. The valve member 12 can be held in a range of intermediate positions in which the opening 16 is partially obscured by the valve member 12.

The metering valve 10 further comprises an inlet 20 which, in use, is connected to a high pressure supply line, and an outlet 22 which, in use, is connected to a delivery line. It will be appreciated that the angular position of the valve member 12 governs the rate at which fuel is supplied through the metering valve 10 to the delivery line, and thus controls the rate at which fuel is supplied to, for example, an engine burner manifold connected to the delivery line.

The shaft 14 is arranged to be driven, in use, by a stepper motor 24 through a gear arrangement 26. A control unit 28, for example in the form of a propulsion control and monitoring unit, although other forms of control unit could be used, controls the operation of the stepper motor 24 and receives position information indicative of the angular position of the valve member 12 from a position sensor 30, for example in the form of an RVDT monitoring the orientation of the shaft 14.

In the embodiment of the invention described herein the stepper motor is of dual phase design with an operating current of 500 mA. It will be appreciated however that the motor can be of a different design with more or fewer phases and a lower or higher operating current.

The control unit 28 is preferably of dual channel form, thus providing the required level of redundancy in the control of the metering valve 10, and consequently the position sensor 30 is also conveniently of dual channel form.

In normal use, the control unit 28 controls the position of the stepper motor 24, and hence the valve member 12 to ensure that fuel is delivered at the correct rate. Position information from the position sensor 30 is used by the control unit 28 to ensure that the valve member 12 is correctly positioned, thus achieving closed loop control over the metering valve 10.

In accordance with the invention, upon powering up of the control unit 28 a calibration operation is undertaken. During the calibration operation the stepper motor 24 is controlled so as to drive the valve member 12 through its entire range of movement between its fully open and fully closed positions and information relating to the stepper motor position and corresponding valve member position as sensed by the position sensor 30 are used to determine a gain value for the metering valve 10 and associated components of the fuel pumping and metering unit of which the metering valve 10 forms part. The gain value is representative of the relationship between the stepper motor position and the corresponding valve member position.

Figure 2:
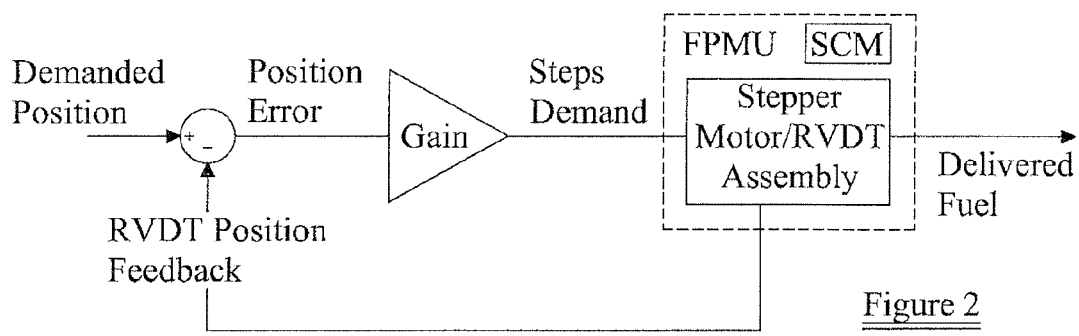
FIG. 2 is a diagram representing the manner in which a gain value is used in a closed loop arrangement.

The gain value is used during normal use of the metering valve 10 to determine the number of steps through which the stepper motor 24 should be driven to achieve a desired movement of the valve member 12, the output of the position sensor 30 being used to provide feedback information to ensure that the valve member 12 is moved to the desired position, thus achieving closed loop control, as shown in FIG. 2.

In the event of a failure resulting in the control unit 28 no longer receiving position information from either channel of the position sensor 30, then closed loop control is no longer possible. Rather than move the metering valve 10 to a fully open, fully closed, or fixed predetermined intermediate position as has usually been the case in prior arrangements, the gain value determined as part of the calibration operation can be used to permit continued control over the metering valve 10. Indeed the position of the valve member 12 is controlled in the same manner as outlined hereinbefore with reference to FIG. 2, but without the use of the position sensor output to provide feedback information. In other words, the calculated gain value is used to determine the stepper motor position that corresponds to a desired valve member position, and the stepper motor is moved to that position. The control, in this mode of operation is an open loop control rather than closed loop control as is the case when the output of the position sensor can provide position feedback information to the control unit. This open loop control is sometimes referred to as reversionary control.

Figure 3:
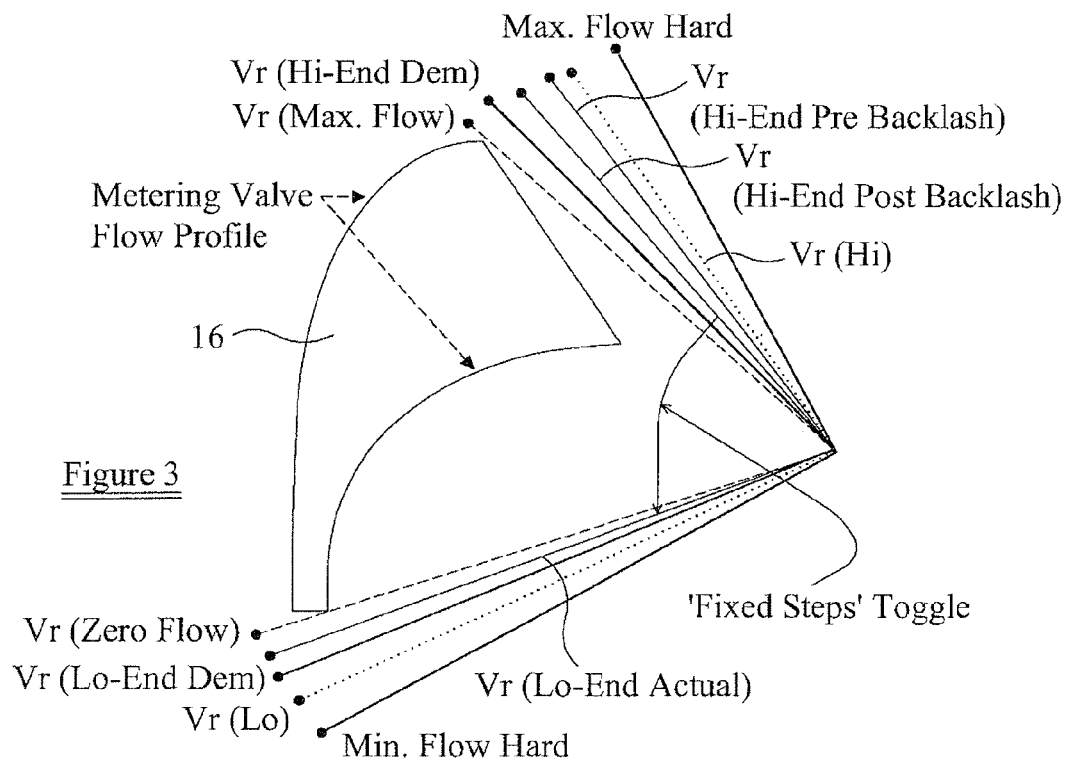
FIG. 3 is an illustration representing some of the parameters used in the method by which the gain value is determined.

FIG. 3 illustrates one method suitable for use in deriving the gain value. It will be appreciated, however, that a number of other methods or algorithms may be used without departing from the scope of the invention.

With reference to FIG. 3, using manufacturer data stored in a memory associated with the control unit and representative of the maximum flow position (Vr Max Flow) of the metering valve 10, the zero flow position Vr (Zero Flow), and the minimum and maximum hard stop positions of the metering valve 10, a high end demand position Vr (Hi-End Dem) and a low end demand position Vr (Lo-End Dem) are calculated using the formulae:

$$Vr(\text{Hi-End Dem}) = Vr(\text{Max Flow}) - 0.25[Vr(\text{Max Flow}) - Vr(\text{Hi})]$$

$$Vr(\text{Lo-End Dem}) = Vr(\text{Zero Flow}) + 0.75[Vr(\text{Lo}) - Vr(\text{Zero Flow})]$$

where Vr (Hi) and Vr (Lo) are offset valve positions, offset by a predetermined distance, for example by 10 motor steps, from the maximum and minimum flow hard stop positions.

The calculated Vr (Hi-End Dem) position will be between the Vr (Max Flow) and Vr (Hi) positions, and the calculated Vr (Lo-End Dem) position will be between the Vr (Zero Flow) and Vr (Lo) positions. Thus, when the valve is in the Vr (Lo-End Dem) position, there will be zero flow, and when the valve is in the Vr (Hi-End Dem) position, maximum flow will occur.

Using these calculated position values, a "Fixed Steps" range is calculated as:

$$\text{Fixed Steps} = \frac{\text{Gain Limit}}{Vr(\text{Hi-End Dem}) - Vr(\text{Lo-End Dem})}$$

where 'Gain Limit' is a fixed value derived from manufacturing data supplied with the specific stepper motor and rotary metering valve arrangement for which the gain calculation is being applied.

The fixed steps range is the number of stepper motor steps required to move between the Vr (Hi-End Dem) and Vr (Lo-End Dem) positions, and thus if the valve is moved through this number of steps, the valve can be swept from a fully open to a fully closed position.

As part of the calibration operation, the valve is moved to the Vr (Hi-End Dem) position, the output of the position sensor being used to determine when this position is reached. Due to the design and manufacturing tolerances associated with the stepper motor and rotary metering valve assembly this Vr (Hi-End Dem) position can fall anywhere between the Vr (Max Flow) and Vr (Hi) positions, as illustrated in FIG. 3. Also, due to the non-quiescent nature of a stepper motor's discrete angular position behaviour whilst attempting to provide control in an analogue manner, commonly referred to as a motor's operational noise, it is important to lock the stepper motor and rotary metering valve assembly in this Vr (Hi-End Dem) position prior to recording this position for use in the gain calculation. This is achieved by the control unit software commanding zero motor steps movement from the Vr (Hi-End Dem) position and then recording this new commanded position as Vr (Hi-End Pre-Backlash). It is recognised that in terms of actual position, as determined by the output of the position sensor, Vr (Hi-End Dem) and Vr (Hi-End Pre-Backlash) are effectively identical. However, in terms of the control unit software there is a need to provide a distinct difference between the two positions, as illustrated in FIG. 3, to ensure that the aforementioned noise factor is removed from the gain calculation.

It was previously noted that the stepper motor steps represent the positions that the motor will remain fixed at when there is no electrical power applied to the motor. These steps also represent the positions that the motor will move to and remain fixed at when pre-determined electrical currents are applied to the two phases of the dual-phase motor. This is effectively a fixed step power/current, and with the operating current of 500 mA the aforementioned zero motor steps movement is commanded by the PCMU applying, for example, 0 mA & 500 mA to the respective phases of the motor. The PCMU control of the stepper motor is such that for each subsequent step there is a shift in the current applied to each phase of 125 mA so that from the zero steps position the sequence of fixed step currents applied to the respective phases will be 125 mA & 375 mA, 250 mA & 250 mA, 375 mA & 125 mA, 500 mA & 0 mA, etc.

The motor is then commanded to move through seven, or another predetermined number of, motor steps and the valve position recorded as Vr (Hi-End Post-Backlash). It will be appreciated that, in driving the motor in this manner it can be ensured that the gears of the gear arrangement 26 are positively engaged.

A value Vr (Lo-End Actual) is then derived by recording the sensor output after having moved the motor by a distance equivalent to the "Fixed Steps" range from the Vr (Hi-End Post-Backlash) position. It will be appreciated that in moving the motor by the "Fixed Steps" range, the valve is moved from the Vr (Hi-End Post-Backlash) position through substantially its full operating range of movement to a fully closed position. After recording the Vr (Lo-End Actual) position sensor output, the gain value can be calculated as:

$$\text{Gain} = \frac{\text{"Fixed Steps" range}}{Vr(\text{Hi-End Post-Backlash}) - Vr(\text{Lo-End Actual})}$$

The gain value so calculated can then be used in the operating technique described hereinbefore with reference to FIG. 2.

Although one specific method for calculating the "Gain" value is described hereinbefore, it will be appreciated that other techniques or methods for deriving a value for "Gain" may be used. Indeed, other calibration methods which involve sweeping the valve between fully open and fully closed positions can be used without departing from the scope of the invention, and arrangements maybe possible in which backlash is not specifically accommodated.

Preferably, the technique used to control the stepper motor and provide finer control, often referred to as granularity, than the aforementioned natural index steps, is one by which the stepper motor position can be controlled to fractions of a stepper motor step, referred to as a micro-stepping method of control. For example the stepper motor position may be controlled to a resolution of one quarter of a natural stepper motor index step. With this micro-stepping method of control, where each micro-step is one quarter of a natural step, the current applied by the PCMU to the phases of the 500 mA motor shifts by 31.25 mA (¼×125 mA) for each micro-step. The PCMU control of the stepper motor at these micro-step positions is even more affected by the aforementioned operational noise. Hence, there is a need not only to provide the zero steps command at start-up as part of the gain calculation, but also to provide monitoring/sampling of the fixed steps movement of the stepper motor wherever possible during its operation. The gear arrangement is conveniently such that, control of the stepper motor to this degree of accuracy equates to controlling the angular position of the valve member to a resolution of 0.08°. However, the invention is not restricted to such an arrangement.

A number of other modifications and alterations are possible without departing from the scope of the invention.

The invention claimed is:

1. A method of controlling the operation of a metering valve driven by a stepper motor, a position sensor normally providing position information to allow control over the metering valve in a closed loop manner, the method comprising the steps of:
performing a calibration operation to derive a relationship between stepper motor position and metering valve position;
controlling the operation of the metering valve in a closed loop manner; and
controlling the operation of the metering valve in an open loop manner in the event that the position sensor output is thought to be unreliable;
wherein the step of performing a calibration operation involves sweeping the metering valve through its range of normal movement between a fully open position and a fully closed position while monitoring the output of the position sensor and calculating a gain value as a ratio of the movement of the stepper motor to the change in the output of the position sensor; and
wherein allowance is made for potential backlash in the drive train between the stepper motor and the metering valve.

2. A method according to claim 1, wherein the stepper motor position is monitored by counting of the steps through which the stepper motor is moved, in use.

3. A method according to claim 1, wherein the metering valve is a rotary main metering valve.

4. A method according to claim 1, wherein the position sensor is an RVDT.

5. A method according to claim 1, wherein the stepper motor is a dual-phase stepper motor controlled by the application of appropriate currents to the phases thereof.

6. A method according to claim 5, wherein the stepper motor is controlled using a micro-stepping technique whereby smaller shifts in the applied currents can be used to achieve movement of the motor through fractions of a natural step.

7. A method according to claim 1, wherein the calibration step is performed as part of a power-up procedure.

8. A method according to claim 1, wherein the gain value is stored in a non-volatile memory associated with the metering unit of which the metering valve forms part.

9. A method according to claim 1, wherein the gain value is determined using information relating to the stepper motor positions corresponding to the zero and maximum flow positions of the metering valve.

10. A method according to claim 9, wherein the stepper motor positions corresponding to the maximum and minimum hard stop positions of the metering valve are further used in determining the gain value.

11. A method according to claim 1, wherein allowance for potential backlash is achieved by driving the metering valve to a known open position, using the position sensor to determine when that position is reached, then driving the stepper motor to move through a predetermined number of steps, and sensing the position of the metering valve using the position sensor.

* * * * *